United States Patent
Bedi et al.

(10) Patent No.: US 7,734,723 B2
(45) Date of Patent: Jun. 8, 2010

(54) DEFERRED HANDLING OF A MESSAGE

(75) Inventors: Bharat Veer Bedi, Portmouth (GB); Andrew James Stanford-Clark, Chale (GB)

(73) Assignee: International Business Machines Corporation, Armonk, NY (US)

( * ) Notice: Subject to any disclaimer, the term of this patent is extended or adjusted under 35 U.S.C. 154(b) by 323 days.

(21) Appl. No.: 11/764,823

(22) Filed: Jun. 19, 2007

(65) Prior Publication Data

US 2008/0082614 A1    Apr. 3, 2008

(30) Foreign Application Priority Data

Jul. 1, 2006    (GB) ................. 0613178.3

(51) Int. Cl.
*G06F 15/16*    (2006.01)
(52) U.S. Cl. ...................... 709/218; 719/318
(58) Field of Classification Search ............... 709/218; 719/318
See application file for complete search history.

(56) References Cited

U.S. PATENT DOCUMENTS

| 6,829,770 | B1 * | 12/2004 | Hinson et al. ............... 719/318 |
| 7,047,484 | B1 * | 5/2006 | Becker et al. ............... 715/201 |
| 7,349,980 | B1 * | 3/2008 | Darugar et al. ............. 709/238 |
| 2008/0107272 | A1 * | 5/2008 | Carmeli et al. ............. 380/278 |
| 2008/0215695 | A1 * | 9/2008 | Duigenan et al. ........... 709/206 |
| 2008/0256553 | A1 * | 10/2008 | Cullen ....................... 719/313 |

* cited by examiner

*Primary Examiner*—Nathan Flynn
*Assistant Examiner*—James E Conaway
(74) *Attorney, Agent, or Firm*—Stephen Calogero; Law Office of Jim Boice

(57) ABSTRACT

An apparatus for deferred handling of a message in a publish/subscribe system comprises a publisher for publishing the message and a subscriber for receiving the message. The apparatus comprises a handler for handling a first message published by a publisher, the first message comprising an instruction associated with said publisher, the instruction comprising topic data, and a generator, responsive to handling of the first message, for using first data associated with the instruction to generate topic data.

14 Claims, 6 Drawing Sheets

"UK"
"UK/Oxfordshire"
"UK/Hampshire"
"UK/Oxfordshire/Oxford"
"UK/Hampshire/Basingstoke"
"UK/Hampshire/Winchester"
"UK/Hampshire/Portsmouth"

First Registry

| Function | Invocation Data |
|---|---|
| (find_help (printer_cartridge)) | `<find_help>`<br>    component_type=local_function<br>        goto lookup_department (printer_cartridge)<br>        return (topic_data)<br>`</find_help>` |
| (find_insurance broker (lowest_insurance_broker _commission_rate | `<find_insurance_broker>`<br>    component_type=external service<br>        goto second_registry<br>        lookup (external service contact)<br>            get (parameter_data)<br>                return (topic_data)<br>`</find_insurance_broker>` |

FIG. 5A

Database A:

| Contact | Type of Error |
|---|---|
| Peripherals department | "printer cartridge"; "spool" |
| Software department | "word processing"; "spreadsheet" |

FIG. 5B

Second Registry:

| External Service | External Service Contact |
|---|---|
| Insurance Broker A | Insurance_Brokers/Insurance_Broker_A |
| Insurance Broker B | Insurance_Brokers/Insurance_Broker_B |
| Bank | Banks/Bank_123 |

FIG. 5C

DEFERRED HANDLING OF A MESSAGE

BACKGROUND OF THE INVENTION

The present invention relates to an apparatus for deferred handling of a message.

Publish and Subscribe (pub/sub) is an effective way of disseminating information to multiple users. Pub/Sub applications can help simplify the task of getting business messages and transactions to a wide, dynamically changing and potentially large audience in a timely manner.

In a pub/sub system such as WebSphere Message Broker (WebSphere is a registered trademark of International Business Machines Corporation), publishers are not concerned with where their messages are going, and subscribers are not interested in where the messages they receive have come from. Instead, a message broker typically assures the integrity of the message source and manages the distribution of a message according to subscriptions registered in the message broker.

Message topics typically provide the key to the delivery of messages between publishers and subscribers. With reference to a pub/sub system (100) as shown in FIG. 1A, instead of including a specific destination address in each message, a publisher (105) assigns a topic to a message. A message broker (110) comprises a matching engine (115) for matching a topic of a published message with a list of subscribers (120) who have subscribed to receive messages that are published to that topic. In response to a match, the message broker (110) sends the published message to the subscriber (120).

Topics are often associated with a hierarchical structure, known as a topic tree. An example of a topic tree is shown in FIG. 1B, wherein the topic tree comprises one root topic. Each character string in the topic tree represents a node of the topic tree. A complete topic is created by aggregating nodes from one or more levels in the topic tree. Levels are separated by a "/" character. The format of a folly specified topic is "root/level2/level3". Valid topics in the topic tree are shown in FIG. 1B. Each topic can comprise data associated with particular locations, values etc.

It should be understood that the message broker (110) does not interpret or attempt to derive meaning from the topic. Rather, the message broker (110) uses the topic to send messages to subscribers who have subscribed to that topic.

In typical pub/sub systems, a topic associated with a message is specified by a publisher at the time of publishing the message. This is rather inflexible for publishers and it would be desirable to provide an improved apparatus.

SUMMARY OF THE INVENTION

In one embodiment, the present invention provides an apparatus for deferred topic data handling of a message in a publish/subscribe system comprising a publisher for publishing the message and a subscriber for receiving the message, the apparatus comprising: a handler for handling a first message published by a publisher, the first message comprising an instruction associated with said publisher, the instruction comprising topic data; and a generator, responsive to handling of the first message, for using first data associated with the instruction to generate topic data.

BRIEF DESCRIPTION OF THE DRAWINGS

The present invention will now be described, by way of example only, with reference to embodiments thereof, as illustrated in the following drawings:

FIG. 5A is a representation of a first registry;
FIG. 5B is a representation of a database;
and
FIG. 5C is a representation of a second registry.

DETAILED DESCRIPTION

Figures 1A, 1B:
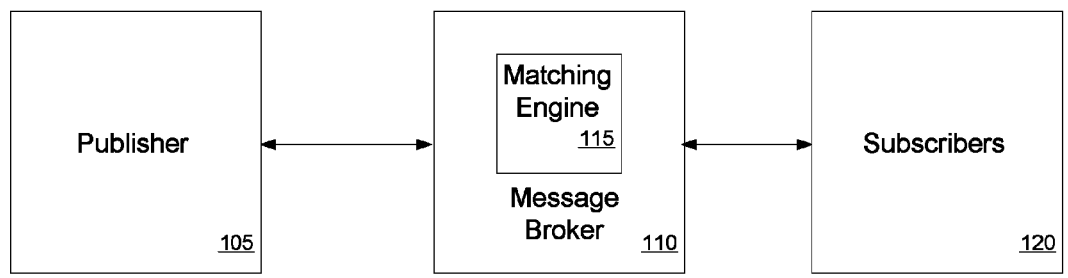
FIG. 1A is block diagram of a prior art pub/sub system.
FIG. 1B is a representation of a topic tree.

As will be appreciated by one of skill in the art, the present invention may be embodied as a method, system, or computer program product. Accordingly, the present invention may take the form of an entirely hardware embodiment, an entirely software embodiment (including firmware, resident software, micro-code, etc.) or an embodiment combining software and hardware aspects all generally referred to herein as a "circuit" or "module." Furthermore, the present invention may take the form of a computer program product on a computer-usable storage medium having computer-usable program code embodied in the medium.

Any suitable computer-usable or computer-readable medium may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-usable or computer-readable would include the following; an electrical connection having one or more wires, a portable computer diskette, a hard disk, a random access memory (RAM), a read-only memory (ROM), an erasable programmable read-only memory (EPROM or Flash memory), an optical fibre, a portable compact disc read-only memory (CD-ROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device.

Computer program code for carrying out operations of the present invention may be written in an object oriented programming language. However, the computer program code for carrying out operations of the present invention may also be written in conventional procedural programming languages, such as the "C" programming language. The program code may execute entirely on the user's computer, partly on the user's computer, as a stand-alone software package, partly on the user's computer and partly on a remote computer or entirely on the remote computer. In the latter scenario, the remote computer may be connected to the user's computer through a local area network (LAN) or a wide area network (WAN), or the connection may be made to an external computer (for example, through the internet using an Internet Service Provider).

An embodiment of the method will now be described in more detail with reference to the figures.

Figure 2:
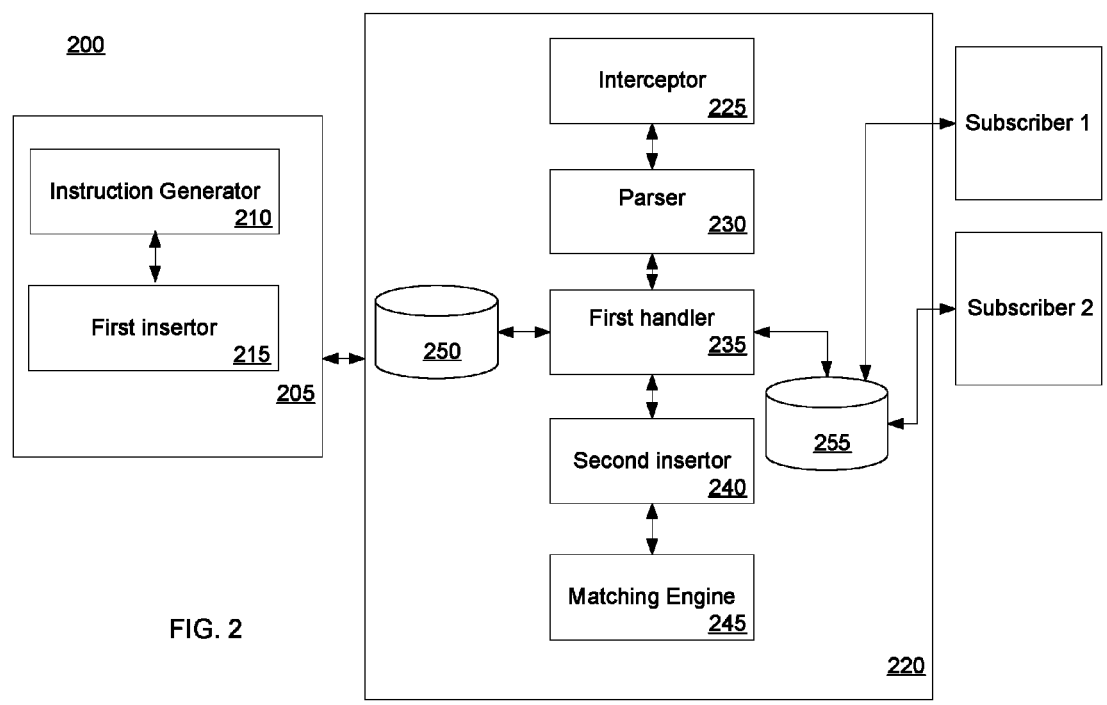
FIG. 2 is block diagram of a pub/sub system according to an embodiment.

With reference to FIG. 2, there is shown a pub/sub system (200) comprising a publisher (205).

The publisher (205) comprises an instruction generator (210) for generating an instruction. The instruction comprises a function with an associated parameter. It should be understood that according to an embodiment, a publisher (205) need not specify a topic or need only specify a subset of a topic.

The publisher (205) also comprises a first inserter (215) for inserting a generated instruction into a message. The publisher (205) communicates with a message broker (220).

The system (200) also comprises a plurality of subscribers (Subscriber 1 and Subscriber 2), each of which send a message to the message broker (220) subscribing to one or more topics. It should be understood that a subscriber can terminate its subscription to messages published on a topic at any time, by sending an "unsubscribe" message for that topic to the message broker (220).

The message broker (220) comprises an interceptor (225) for intercepting a message received from the publisher (205). The interceptor (225) communicates with a parser (230) for parsing the received message to locate an instruction. The parser (230) is operable to pass an instruction to a handler (235).

The handler (235) handles a message comprising an instruction, wherein the handler (235) has access to a first registry (250) for storing data associated with one or more functions and a second registry (255) for storing data associated with one or more subscribers.

Figure 3:
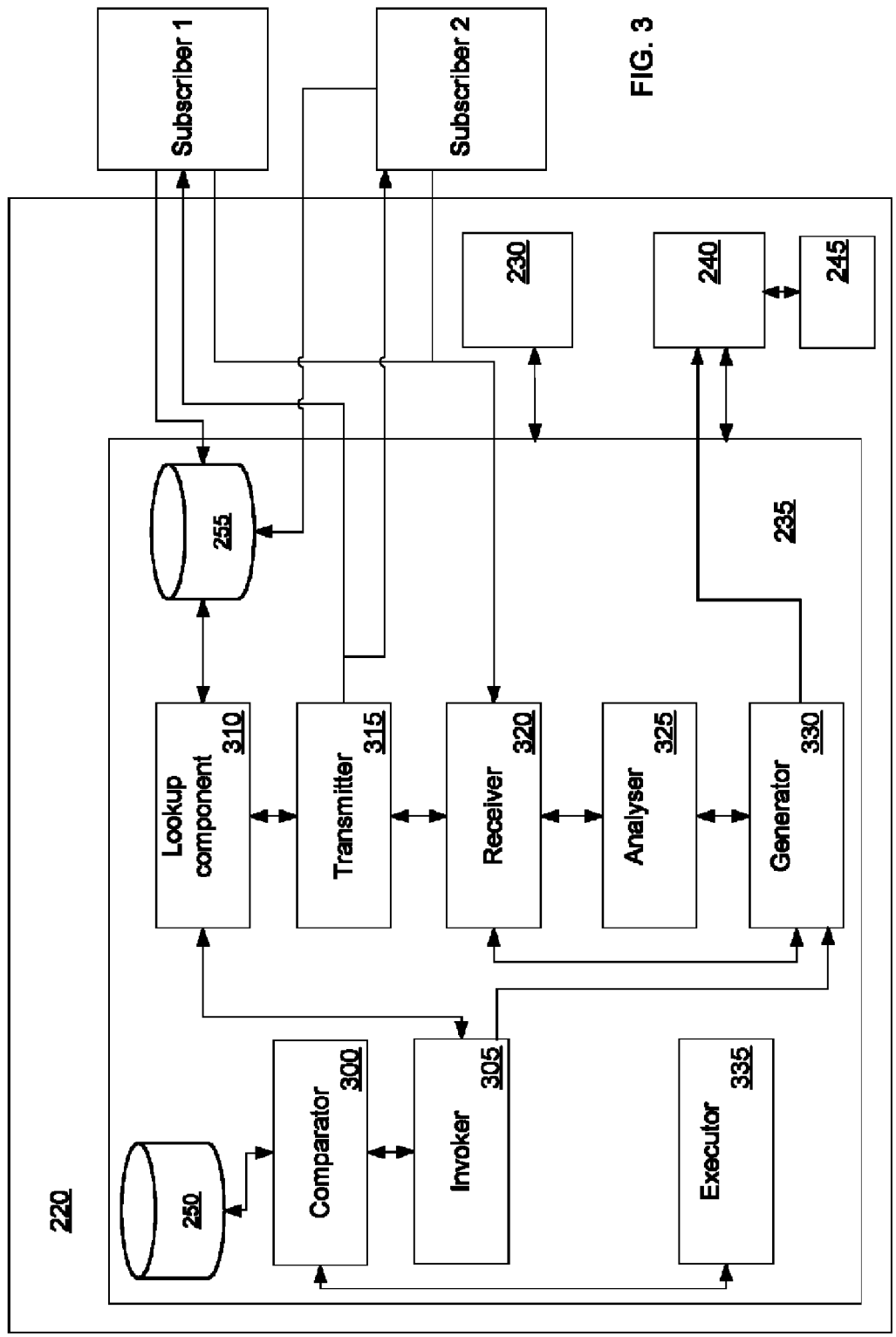
FIG. 3 is block diagram of a handler of the pub/sub system depicted in FIG. 2.
Figure 4:
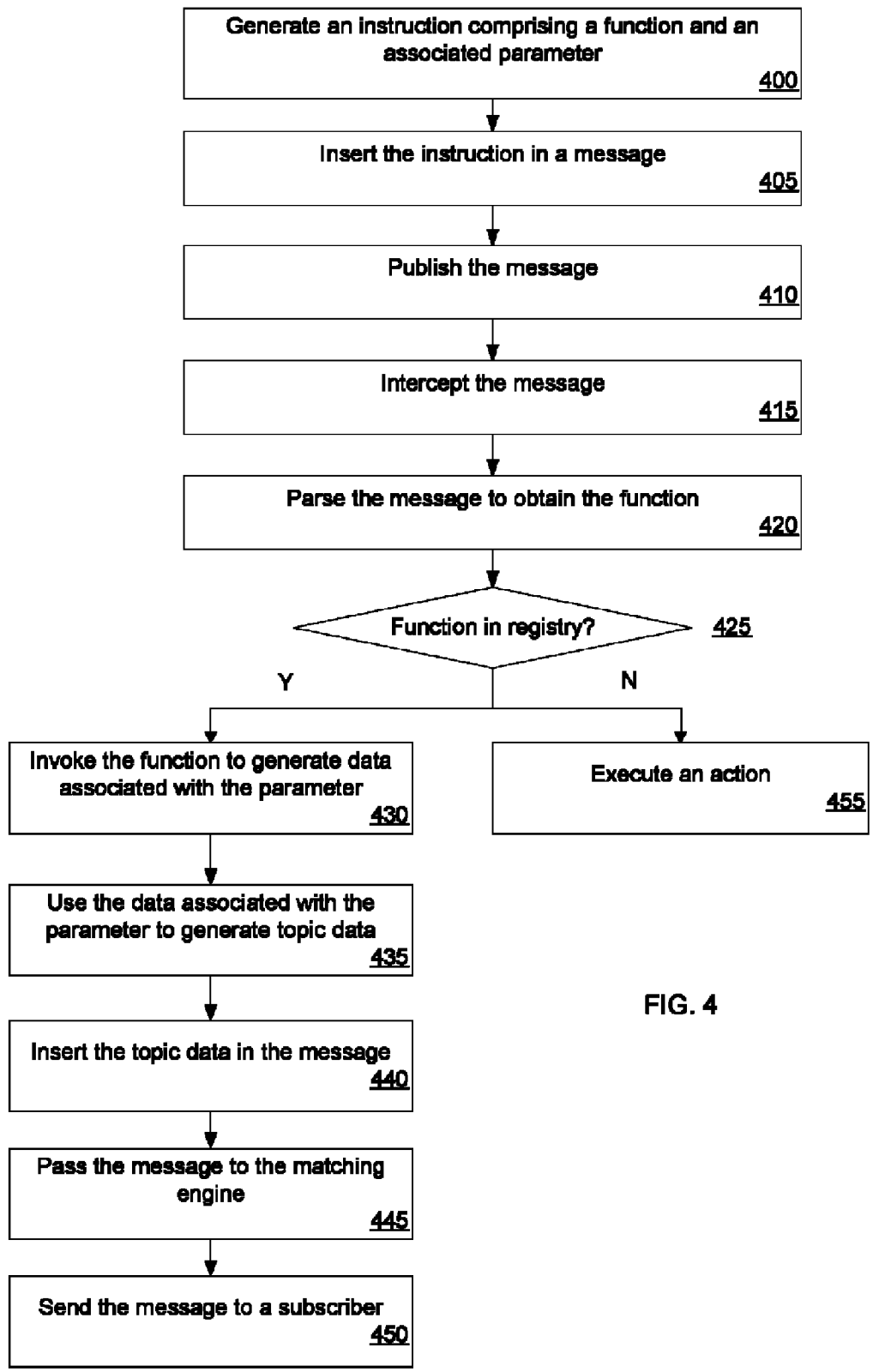
FIG. 4 is a flow chart showing the operational steps involved in a process according to an embodiment of the present invention

With reference to FIG. 3, the handler (235) is shown in more detail. The handler (235) comprises a comparator (300) for comparing a located function with the first registry (250) in order to determine whether the function is stored in the first registry (250). If the function is not stored in the first registry (250), an executor (335) executes an action.

The comparator (300) is operable to execute an invoker (305) for invoking a located function.

The invoker (305) is operable to pass parameter data received in response to invoking a function to a generator (330). The generator (330) uses the parameter data to generate topic data and sends the topic data to a second insertor (240).

The invoker (305) is also operable to invoke a lookup component (310). The lookup component (310) is operable to look up data associated with a component that can assist with function invocation (e.g. by supplying parameter data). It should be understood that the component can be a subscriber. A transmitter (315) is operable to transmit data associated with a function to the component.

An analyzer (325) is operable to analyse parameter data received from the component and is operable to determine associated analyzer data. The analyzer (325) is also operable to pass the analyzer data to the generator (330). The generator (330) is operable to use the analyzer data associated with the parameter data to generate topic data.

Alternatively, a receiver (320) is operable to receive parameter data from the component (i.e. without a requirement for the analyzer (325) to determine analyzer data). The receiver (320) is operable to pass the received parameter data to the generator (330). As described above, the generator (330) uses the parameter data to generate topic data and sends the topic data to the second insertor (240).

The second insertor (240) is operable to insert topic data into an intercepted message. The second insertor (240) is operable to pass an intercepted message comprising topic data to a matching engine (245).

The matching engine (245) matches a topic of a message with a list of the subscribers who have subscribed to receive messages that are published to that topic. In response to a match, the message broker (220) sends the published message to the subscribers.

A first example of an embodiment will now be described with reference to the figures.

Firstly, the publisher (205) generates a message. The instruction generator (210) generates (step 400) an instruction. The instruction comprises a function with an associated parameter. An example of an instruction is shown below:

Instruction:
&instruction(find_help(printer_cartridge))

The above instruction comprises a number of components. A "&instruction" component indicates a start of an instruction and an end of an instruction is indicated with a right parenthesis. Following the "&instruction" component, the outer parentheses "( )" indicate a particular function (i.e. wherein the function is "find_help"). The inner parentheses indicate one or more parameters that are passed to the particular function (i.e. wherein the parameter "printer_cartridge" is passed to the function "find_help"). It should be understood that multiple parameters can be passed to a function.

At step 405, the first insertor (215) inserts the instruction into a message.

The message comprises a header comprising metadata identifying at least one attribute of the message and in the first example, the first insertor (215) inserts the instruction as an attribute into the header. It should be understood that, in the prior art, a topic is identified as an attribute in a message. However, according to an embodiment, a topic does not have to be identified, or only a subset of a topic need be identified.

An example of an attribute is shown below, wherein a "help" component indicates a root of a topic and the first "/" character following the "help" component indicates another level of the topic. Following the first "/" character is the instruction. Following the instruction is a second "/" character indicating another level of the topic. Following the second "/" character is a "Room_1" component.

Attribute:
help/&instruction(find_help(printer_cartridge))/Room_1

An example of a message is shown below, wherein the message also comprises a body having data to be published In the message below, "The printer_cartridge needs replacing in Room 1" represents data to be published:

Message:

```
<message>
    <header>
        <topic>
            help/&instruction(find_help(printer_cartridge))/
            Room_1
        </topic>
    </header>
    <body> The printer_cartridge needs replacing in Room 1
    </body>
</message>
```

At step 410, the publisher (205) publishes the message at the message broker (220).

Upon receiving the message, the interceptor (225) intercepts (step 415) the message and passes the message to the parser (230). If the message (e.g. the entire message, or a subset of the message e.g. the instruction, the function etc.) causes an error at the parser (230), a notification is generated and sent to the publisher (205). Alternatively, the publisher (205) can retry publishing the message (e.g. after a pre-configurable time threshold has expired).

The parser (230) parses (step 420) the message in order to locate an instruction. The parser (230) is pre-configurable to locate the header and to identify components that indicate a start and an end of an instruction. Furthermore, the parser (230) locates a function and one or more associated parameters. The parser (230) is pre-configurable to identify components that indicate a function (i.e. outer parentheses) and one or more associated parameters (i.e. inner parentheses).

In response to locating the "find_help" function (and the associated "printer_cartridge" parameter), the parser (230) passes the "find_help" function to the handler (235). In response to receiving the "find_help" function, the comparator (300) compares the "find_help" function with the first registry (250) in order to determine (step 425) whether the "find_help" function is stored in the first registry (250). In response to determining that the "find_help" function is not stored in the first registry (250), the executor (335) is operable to execute an action (step 455) (e.g. an alert is generated, a further registry is searched etc.).

The first registry (250) stores data associated with one or more functions. Examples of data held in the first registry (250) is shown in FIG. 5A, wherein a record comprises two fields, namely, a "Function" field comprising an identifier associated with a function and an "Invocation data" field comprising data associated with invocation of the function.

In the first example, the comparator (300) compares the "find_help" function against data in the "Function" fields. In response to the comparison, the comparator (300) determines that, an identifier associated with the "find_help" function is stored in the first registry (250). The comparator (300) executes the invoker (305) and passes the identifier associated with the "find_help" function to the invoker (305).

The invoker (305) accesses the first registry (250) and uses the identifier associated with the "find_help" function to determine associated invocation data. An example of the invocation data is shown in FIG. 5A. A declaration "component_type=local_function" states that a component that can assist with function invocation is a local function. A sub-function "goto" causes a local function "lookup_department" to be invoked. A sub-function "return" causes topic data to be returned.

The local function "lookup_department" causes: database_A to be accessed; the parameter (i.e. "printer_cartridge") to be queried against database_A; and data associated with the parameter (i.e. data from an associated first field in database_A), termed herein "parameter data" to be returned.

A representation of database_A is shown in FIG. 5B, wherein a record comprises two fields, namely, a first field (i.e. "Contact") comprising an identifier associated with a contact and a second field (i.e. "Type of error") comprising an identifier associated with a type of error. Thus, for example, for a "word processing" error, a "Software department" should be contacted.

At step 430, the invoker (305) uses the invocation data and the parameter associated with, the "find_help" function to invoke the "find_help" function. That is, the invoker (305) invokes the "lookup_department" local function, causing database_A to be accessed. Furthermore, the parameter "printer_cartridge" is queried against database_A and found in the second field (i.e. "Type of error"). Data (i.e. "Peripherals department") from an associated first field (i.e. "Contact") in database_A is returned i.e. parameter data.

Once the local function has been executed, the invoker (305) invokes the sub-function "return" which causes topic data to be returned by passing the parameter data (i.e. "Peripherals department") to the generator (330). The generator (330) uses (step 435) the parameter data to generate topic data.

The generator (330) may be configurable to format the parameter data to topic data. For example the generator (330) is configurable to remove a character that is not valid for use in a topic.

In the first example, the generator (330) is configurable to substitute a space character for an underscore character. Thus, the parameter data (i.e. "Peripherals department") is formatted to topic data, namely, "Peripherals_department".

The generator (330) is operable to pass the topic data to the second inserter (240).

The second inserter (240) is operable to insert (step 440) the topic data into the intercepted message. The second inserter (240) is operable to replace the instruction in the message with the topic data. An example of the resulting message is shown below:

---

Message:

```
<message>
    <header>
        <topic>
            help/Peripherals_department/Room_1
        </topic>
    </header>
    <body> The printer_cartridge needs replacing in Room 1
        </body>
</message>
```

---

The second inserter (240) is operable to pass (step 445) the message to the matching engine (245).

The matching engine (245) matches the topic (i.e. "help/Peripherals_department/Room_1") with a list of subscribers. A list of subscribers is shown below:

---

| | List: | |
|---|---|---|
| Subscriber: | Topic: | |
| Subscriber 1 | help/Peripherals_department/Room_1; | |
| | help/Software_department/Room_1; | |
| | help/Marketing_department/Room_1 | |
| Subscriber 2 | help/Software_department/Room_1 | |

---

In the first example, the matching engine (245) matches the topic with Subscriber 1. In response to the match, the message broker (220) sends (step 450) the message to Subscriber 1.

A publisher need not have knowledge of a topic or a sub-topic. Furthermore, the publisher need not know which department to contact in order to find help to resolve a printer cartridge error. Rather, by publishing an instruction comprising a function, an appropriate topic or sub-topic is generated and the message is published to the generated topic. In response, an appropriate subscriber is able to receive the message. In the first example, an administrator in the "Peripherals department" receives a message associated with a printer cartridge which can then, be actioned (e.g. the administrator can replace the printer cartridge).

A second example of an embodiment will now be described with reference to the figures.

In the second example, Subscriber 1 and Subscriber 2 are components that can assist with function invocation. It should be understood that a component that can assist with function invocation need not comprise a subscriber.

Furthermore, Subscriber 1 and Subscriber 2 represent external services (Insurance Broker A and Insurance Broker B respectively) and the publisher (205) represents a consumer. A service comprises any discrete function that can be offered to an external consumer.

The system (200) represents a pub/sub based service-oriented architecture (SOA), that is, an integration architecture based on the concept of a service. Advantageously, consumers and services are decoupled by the message broker which acts as an intermediary. Thus, a consumer's view of a service is decoupled from the actual implementation of the service; e.g., technical aspects of services interaction are decoupled. It should be understood that non-services applications can also be integrated into the SOA.

Firstly, the publisher (205) generates a message. The instruction generator (210) generates (step 400) an instruction. The instruction comprises a function with an associated parameter. An example of an instruction is shown below;

---
Instruction:

&instruction(find_insurance_broker
(lowest_insurance_broker_commission))

---

The above instruction comprises a number of components. A "&instruction" component indicates a start of an instruction and an end of an instruction is indicated with an outer parenthesis. Following the "&instruction" component, the outer parentheses "( )" indicate a particular function (i.e. wherein the function is "find_insurance_broker"). The inner parentheses indicate one or more parameters that are passed to the particular function (i.e. wherein the parameter "lowest_insurance_broker_commission" is passed to the function "find_insurance_broker").

At step 405, the first insertor (215) inserts the instruction into a message.

The first insertor (215) inserts the instruction as an attribute into the header. An example of an attribute is shown below, wherein a topic is not indicated, rather, only the instruction is indicated.

Attribute:
&instruction(find_insurance_broker(lowest_insurance_broker_commission))

An example of a message is shown below, wherein the message also comprises a body having data to be published. In the message below, "Please provide a quote for home insurance" represents data to be published:

---
Message:

```
<message>
    <header>
        <topic>
            &instruction(find_insurance_broker
                (lowest_insurance_broker_commission))
        </topic>
    </header>
    <body> Please provide a quote for home insurance
    </body>
</message>
```
---

At step 410, the publisher (205) publishes the message at the message broker (220). Upon receiving the message, the interceptor (225) intercepts (step 415) the message and passes the message to the parser (230). If the message causes an error at the parser (230), a notification is generated and sent to the publisher (205). Alternatively, the publisher (205) can retry the action of publishing the message.

The parser (230) parses (step 420) the message in order to locate an instruction. Furthermore, the parser (230) locates a function and one or more associated parameters.

In response to locating the "find_insurance_broker" function (and the associated "lowest_insurance_broker_commission" parameter), the parser (230) passes tire "find_insurance_broker" function to the handler (235). In response to receiving the "find_insurance_broker" function, the comparator (300) compares the "find_insurance_broker" function with the first registry (250) depicted in FIG. 5A, in order to determine (step 425) whether the "find_insurance_broker" function is stored in the first registry (250). In response to determining that the "find_insurance_broker" function is not stored in the first registry (250), the executor (335) is operable to execute an action (step 455).

In the second example, the comparator (300) compares the "find_insurance_broker" function against data in the "Function" fields. In response to the comparison, the comparator (300) determines that an identifier associated with the "find_insurance_broker" function is stored in the first registry (250). The comparator (300) executes the invoker (305) and passes the identifier associated with the "find_insurance_broker" function to the invoker (305).

The invoker (305) accesses the first registry (250) and uses the identifier associated with the "find_insurance_broker" function to determine associated invocation data. An example of the invocation data is shown in FIG. 5A. A declaration "component_type=external_service" states that a component that can assist with function invocation is an external service. A sub-function "goto" causes the second registry (255) to be accessed, a sub-function "lookup" causes an external service to be looked up by querying a parameter against a first field of the second registry (255); a sub-function "get" causes data associated with a parameter (termed herein "parameter data") to be obtained and a sub-function "return" causes topic data to be returned.

The second registry (255) stores data associated with one or more external services. Examples of data held in the second registry (255) are shown in FIG. 5C, wherein a record comprises two fields, namely, a first field (i.e. "External Service") comprising an identifier associated with an external service and a second field (i.e. "External Service Contact") comprising data associated with a means of contacting an external service (e.g. a URL, a topic etc.).

At step 430, the invoker (305) uses the invocation data to invoke the "find_insurance_broker" function.

In accordance with the "goto" sub-function, the invoker (305) invokes the lookup component (310) which accesses the second registry (255). In accordance with the "lookup" sub-function, the lookup component (310) compares the parameter (i.e. "lowest_insurance_broker_commission_rate") to data in the first field (i.e. "External Service"). In response to the comparison, the lookup component (310) determines that the character string "insurance_broker" within the "lowest_insurance_broker_commission_rate" parameter matches two records in the second registry (255), namely a record associated with "Insurance Broker A" and a record associated with "Insurance Broker B".

In response to identifying appropriate external services, in accordance with the sub-function "get", data associated with the "lowest_insurance_broker_commission_rate" parameter is obtained. That is, the transmitter (315) publishes a message generated by the generator (330) to topics (i.e. the data in the "external service contact" field) associated with each of the external services (i.e. to the topics "Insurance_Brokers/Insurance_Broker_A" and "Insurance_Brokers/Insurance_Broker_B"). An example of a body of each message is shown below:

"Please provide your commission rate"

If the message causes an error at an external service, a notification is generated and sent to the generator (330). Alternatively, the transmitter (315) can retry transmitting the message.

Each of the external components publishes a response (i.e. parameter data) to their topics. An example of a body of the response from Insurance Broker A is shown below:

"Commission rate is 2%"

An example of a body of the response from Insurance Broker B is shown below:

"Commission rate is 4%"

The receiver (320) receives the parameter data. Once the parameter data has been obtained, the invoker (305) invokes the sub-function "return" which causes topic data to be returned.

That is, the receiver (320) passes the parameter data to the analyzer (325), which analyses the parameter data in order to determine a lowest commission rate. The analyzer (325) determines that a commission rate from Insurance Broker A is lower than a commission rate from Insurance Broker B.

The analyzer (325) passes a result of its analysis (termed herein analyzer data) (i.e. "Insurance Broker A") to the generator (330). The generator (330) uses (step 435) the analyzer data to generate topic data.

The generator (330) is configurable to format the analyzer data to topic data. For example the generator (330) is configurable to aggregate the analyzer data as another level with a pre-configured root topic (i.e. "Insurance_Brokers") and to substitute a space character for an underscore character. Thus, the analyzer data (i.e. "Insurance Broker A") is formatted to topic data, namely, "Insurance_Brokers/Insurance_Broker_A".

Alternatively, in the second example, the generator (330) compares the analyzer data to the topics associated with the external services, in order to obtain topic data.

Alternatively, the generator (330) is associated with the external service, such that the second insertor (240) receives topic data from the external service itself.

The generator (330) is operable to pass the topic data to the second insertor (240) which is operable to insert, (step 440) the topic data into the intercepted message. The second insertor (240) is operable to replace the instruction in the message with the topic data. An example of the resulting message is shown below;

| Message: |
|---|
| <message><br>   <header><br>      <topic><br>         Insurance_Brokers/Insurance_Broker_A<br>      </topic><br>   </header><br>   <body> Please provide a quote for home insurance </body><br></message> |

The second insertor (240) is operable to pass (step 445) the message to the matching engine (245).

The matching engine (245) matches the topic (i.e. "Insurance_Brokers/Insurance_Broker_A") with a list of subscribers. A list of subscribers is shown below:

| List: | |
|---|---|
| Subscriber: | Topic: |
| Subscriber 1 (Insurance Broker A) | Insurance_Brokers/Insurance_Broker_A |
| Subscriber 2 (Insurance Broker B) | Insurance_Brokers/Insurance_Broker_B |

In the second example, the matching engine (245) matches the topic with Subscriber 1. In response to the match, the message broker (220) sends (step 450) the message to Subscriber 1 (i.e. Insurance Broker A).

Alternatively, in the second example, the matching engine (245) matches the topic with the data in the "External Service Contact" field, as the data in the "External Service Contact" field comprises one or more topics.

Advantageously, a publisher need not have knowledge of a topic or a sub-topic. Furthermore, the publisher need not know which insurance broker to find (i.e. an insurance broker with a lowest commission) in order to obtain a quote for home insurance. Rather, by publishing an instruction comprising a function, an appropriate topic or sub-topic is generated and the message is published to the generated topic. In response, an appropriate subscriber is able to receive the message. In the second example, an insurance broker with a lowest associated commission rate can receive a message which can then be actioned (e.g. the insurance broker can respond with a quote for home insurance).

In some current pub/sub systems, a publisher can request the message broker to retain a current message (associated with a topic), such that if new subscribers subscribe to the message broker, they can receive the current message associated with that topic. In an example, if a publisher publishes a message and requests a message broker to retain the published message, a subscriber who subsequently subscribes to a topic associated with the published message receives the published message immediately from the message broker. This means that new subscribers do not have to wait for data to be published again before they receive it. The message broker retains only one publication for each topic, so the previous publication is deleted when a new one arrives.

According to an embodiment, the handler (235) handles a retained message (i.e. handles an associated instruction) when it receives the retained message from the parser (230). This has the effect of limiting the amount of time between the publishing of the message and its handling by the handler (235).

Alternatively, the handler (235) handles a retained message (i.e. handles an associated instruction) when a new subscriber subscribes. This has the effect of lengthening the amount of time between the publishing of the message and its handling by the handler (235).

Alternatively, handling (i.e. evaluation of an associated instruction) can occur after a retained message is published and re-handling can occur when a new subscriber subscribes.

In a first example, a message is handled after a retained message is published and a resulting topic is generated. Brokers/Insurance_Broker_A. A new subscriber subscribes to the topic Brokers/Insurance_Broker_A. The retained message is re-handled when the new subscriber subscribes and a resulting topic is generated: Brokers/Insurance_Broker_B. In response to the re-handling, the new subscriber does not receive the message as the message now has an associated topic of Brokers/Insurance_Broker_B.

In this embodiment, it should be understood that because re-handling of a message when a new subscriber subscribes can occur following a significant time period from when the retained message is published, advantageously, the resulting topic is based on a more current value of a parameter (e.g. Insurance_Broker_B has the lowest_insurance_broker_commission rather than Insurance_Broker_A).

In a second example, a message is handled after a retained message is published and a resulting topic is generated: Brokers/Insurance_Broker_A. A new subscriber subscribes to the topic Brokers/Insurance_Broker_B. The retained message is re-handled when the new subscriber subscribes and a resulting topic is generated: Brokers/Insurance_Broker_B. In response to the re-handling, the new subscriber receives the message as the message now has an associated topic of Brokers/Insurance_Broker_B. The message can now be retained for topic Brokers/Insurance_Broker_B. Alternatively, die message is not retained for topic Brokers/Insurance_Broker_B. Alternatively, a message associated with any topics generated by a particular function is retained.

In response to re-handling, the broker notifies the publisher of a resulting topic.

A user can optionally invoke the system of an embodiment in conjunction with the retain mechanism.

Some known messaging systems provide persistent messaging, in which messages are saved to logs at the message broker in persistent storage (such as disk storage). Persistently stored messages are able to survive most failures and restarts of the messaging system. In response to a failure other than a disk failure, the messages can be recovered from the logged data and persistently-stored queues. The recoverability of persistent messages is a significant factor in achieving assured once-only message delivery.

According to an embodiment, the handler (235) handles a persistent message when it receives the persistent message from the parser (230). This has the effect of limiting the amount of time between the publishing of the message and its handling by the handler (235).

Alternatively, the handler (235) handles a persistent message after a failure. This has the effect of lengthening the amount of time between the publishing of the message and its handling by the handler (235).

Alternatively, the handler (235) handles a persistent message when it receives the persistent message from the parser (230) and re-handles the persistent message after a failure.

For example, a message is handled after a persistent message is published and a resulting topic is generated; Brokers/Insurance_Broker_A. After a failure, the persistent message is re-handled and a resulting topic is generated; Brokers/Insurance_Broker_B.

After the failure, the message is published to the topic Brokers/Insurance_Broker_B. Thus, any subscribers that subscribe to the topic Brokers/Insurance_Broker_B, receive the message. In this embodiment, the message is still persisted.

Alternatively, the message is not persisted. In this embodiment, it should be understood that because re-handling of a message after a failure can occur following a significant time period from when the persistent message is published, advantageously, the resulting topic is based on a more current value of a parameter (e.g. Insurance_Broker_B has the lowest_insurance_broker_commission rather than Insurance_Broker_A).

Alternatively, rather than publishing the message to the topic Brokers/Insurance_Broker_B, after a failure, the message is still published to the topic Brokers/Insurance_Broker_A. Thus, any subscribers that subscribe to the topic Brokers/Insurance_Broker_A, still receive the message, In response to handling of a persistent message, the broker notifies the publisher of a resulting topic.

A user can optionally invoke the system of an embodiment in conjunction with the persistence mechanism.

In some known messaging systems, a publisher has low connectivity. Thus, if a message is handled when a message broker receives the message (i.e. once a publisher has connected), it should be understood that, advantageously, the resulting topic is based on a more current value of a parameter.

The present invention provides a system wherein a publisher need not have knowledge of a topic or a sub-topic. This is advantageous in a scenario wherein a publisher may not know a topic (or a sub-topic) to publish to. For example, this can be due to the publisher not having capacity or resources to determine the topic (or sub-topic) e.g. the publisher can be a "thin client" and therefore advantageously, the burden of the work required to determine topic data is executed by other components (e.g. the message broker, a subscriber etc.).

In another example, the topic (or sub-topic) can have access restrictions (e.g. associated with confidentiality, security etc.) which prevent a publisher from knowing about the topic (or sub-topic).

In yet another example, the publisher may not know how to contact a component that can assist with function invocation. Alternatively, the publisher may not know which component to contact. Alternatively, the publisher may have a different message protocol than the component, thereby causing communication incompatibility, As will be recognized by persons skilled in the relevant art, other configurations or types of computer systems can be equally well used to execute computer software that assists in implementing the techniques described herein, and various alterations and modifications can be made to the techniques and arrangements described by way of example herein.

What is claimed is:

1. An apparatus for deferred topic data handling in a publish/subscribe apparatus comprising a publisher for publishing a first message and a subscriber for receiving the topic data in a second message, the apparatus comprising:
   a processor;
   a memory;
   a computer handler for handling the first message published by the publisher, the first message comprising an instruction, said instruction comprising a function with an associated parameter;
   a comparator for comparing said function with a first storage component in order to determine whether said function is stored in said first storage component;
   a generator for using said function and said parameter data to generate the deferred topic data; and
   an inserter for inserting the deferred topic data into the second message for distribution to the subscriber.

2. An apparatus as claimed in claim 1, wherein the deferred topic data comprises a topic.

3. An apparatus as claimed in claim 2, further comprising a parser for parsing the first message in order to locate said instruction.

4. An apparatus as claimed in claim 3, further comprising an invoker, responsive to said function being stored in said first storage component, for invoking said function.

5. An apparatus as claimed in claim 4, wherein said invoker is operable to pass parameter data received in response to invoking said function.

6. A method for deferred topic data handling in a publish/subscribe system comprising a publisher for publishing a first message and a subscriber for receiving the deferred topic data in a second message, the method comprising:
   handling the first message published by the publisher, the first message comprising an instruction, said instruction comprising a function with an associated parameter;
   comparing said function with a first storage component in order to determine whether said function is stored in said first storage component;
   using said function and said parameter data to generate the deferred topic data; and
   inserting the deferred topic data into the second message for distribution to the subscriber.

7. A method as claimed in claim 6, wherein the deferred topic data comprises a topic.

8. A method as claimed in claim 7, further comprising parsing the first message in order to locate said instruction.

9. A method as claimed in claim 8, further comprising invoking said function, in response to said function being stored in said first storage component.

10. A method as claimed in claim 9, further comprising passing parameter data received in response to invoking said function.

11. A computer program product for providing deferred topic data handling in a publish/subscribe system comprising a publisher for publishing a first message and a subscriber for receiving the deferred topic data in a second message, the computer program product comprising a computer readable storage medium having computer usable program code embodied therewith, the computer usable program code comprising:
   computer usable program code configured to handle the first message published by the publisher, the first message comprising an instruction, said instruction comprising a function with an associated parameter;
   computer usable program code configured to compare said function with a first storage component in order to determine whether said function is stored in said first storage component:
   computer usable program code configured to use said function and said parameter data to generate the deferred topic data; and
   computer usable program code configured to insert the deferred topic data into a second message for distribution to the subscriber.

12. A computer program product as claimed in claim 11 wherein the deferred topic data comprises a topic.

13. A computer program product as claimed in claim 12 further comprising computer usable program code configured to parse the first message in order to locate said instruction.

14. A computer program product as claimed in claim 13 further comprising computer usable program code configured to invoke said function, in response to said function being stored in said first storage component.

* * * * *